(12) United States Patent
Kobayashi

(10) Patent No.: US 9,873,165 B2
(45) Date of Patent: Jan. 23, 2018

(54) PISTON ROD MANUFACTURING METHOD

(71) Applicant: KYB-YS CO., LTD., Nagano (JP)

(72) Inventor: Nobuyuki Kobayashi, Nagano (JP)

(73) Assignee: KYB-YS Co., Ltd., Nagano (JP)

( * ) Notice: Subject to any disclaimer, the term of this patent is extended or adjusted under 35 U.S.C. 154(b) by 78 days.

(21) Appl. No.: 14/914,006

(22) PCT Filed: Aug. 11, 2014

(86) PCT No.: PCT/JP2014/071190
§ 371 (c)(1),
(2) Date: Feb. 24, 2016

(87) PCT Pub. No.: WO2015/029762
PCT Pub. Date: Mar. 5, 2015

(65) Prior Publication Data
US 2016/0199951 A1 Jul. 14, 2016

(30) Foreign Application Priority Data
Aug. 26, 2013 (JP) ................................. 2013-174759

(51) Int. Cl.
*F16J 7/00* (2006.01)
*B23K 20/12* (2006.01)
(Continued)

(52) U.S. Cl.
CPC ............ *B23K 20/12* (2013.01); *B23K 20/129* (2013.01); *B23K 31/125* (2013.01); *B23P 15/10* (2013.01);
(Continued)

(58) Field of Classification Search
CPC ............ B23K 20/129; B23K 2201/003; B23K 20/12–20/1215; B23P 2700/04;
(Continued)

(56) References Cited

U.S. PATENT DOCUMENTS 3,399,801 A * 9/1968 Bent ........................ F16J 13/00
220/233
2010/0163601 A1* 7/2010 Grooms ............... B23K 20/121
228/102

(Continued)

FOREIGN PATENT DOCUMENTS

JP 2010-194711 A 9/2010
JP 2010194711 A * 9/2010 ............. B23K 20/12
(Continued)

OTHER PUBLICATIONS

English Translation of Dojo JP2011056531A.*
English Translation of Bass JP2010194711A.*

*Primary Examiner* — Jason L Vaughan
*Assistant Examiner* — Amanda Meneghini
(74) *Attorney, Agent, or Firm* — Rabin & Berdo, P.C.

(57) ABSTRACT

A piston rod manufacturing method of manufacturing a piston rod by joining a solid rod main body and a solid rod head includes a first step of joining respective end surfaces of the rod main body and the rod head by friction welding; and a second step of performing boring process on an axial center portion from the rod head side so as to penetrate through a joining face between the rod main body and the rod head.

3 Claims, 4 Drawing Sheets

(51) Int. Cl.
    *B23K 31/12*       (2006.01)
    *B23P 15/10*       (2006.01)
    *F16C 7/02*        (2006.01)
    *F15B 15/14*       (2006.01)
    *B23K 101/00*     (2006.01)

(52) U.S. Cl.
    CPC .......... *F15B 15/1457* (2013.01); *F16C 7/023* (2013.01); *F16J 7/00* (2013.01); *B23K 2201/003* (2013.01)

(58) Field of Classification Search
    CPC ........... B23P 2700/50; Y10T 29/49288; Y10T 29/4929; Y10T 29/49291; F02F 2003/0061; F02F 3/0015
    USPC .............. 228/112.1–114.5, 159–162, 2.1–2.3
    See application file for complete search history.

(56) References Cited

U.S. PATENT DOCUMENTS

2010/0213245 A1     8/2010    Bass
2012/0160899 A1     6/2012    Dogami et al.

FOREIGN PATENT DOCUMENTS

JP         2011-056531 A     3/2011
JP         2011056531 A   *  3/2011  ............. B23K 20/12

\* cited by examiner

PISTON ROD MANUFACTURING METHOD

TECHNICAL FIELD

The present invention relates to a piston rod manufacturing method.

BACKGROUND ART

A rod main body and a rod head are generally manufactured by processing a steel material manufactured by continuous casting. Impurities caused by center segregation exist in a central portion of the steel material manufactured by the continuous casting. Therefore, there is a risk that delayed fracture is caused at a center segregation portion if the rod main body and the rod head are joined by friction welding.

JP2011-56531A discloses a piston rod manufacturing method including a step of hollowing out respective axial center portions of a rod main body and a rod head from respective end surfaces thereof to remove impurities caused by center segregation, and a step of joining the respective end surfaces of the rod main body and the rod head by friction welding.

Accordance to the piston rod manufacturing method disclosed in JP2011-56531A, the respective end surfaces of the rod main body and the rod head are joined integrally by friction welding after the impurities existing in the axial center portion have been removed, and thereby, it is possible to manufacture a piston rod having the joining face with no impurities. Therefore, in accordance with the piston rod manufacturing method disclosed in JP2011-56531A, it is possible to improve the joint strength between the rod main body and the rod head.

SUMMARY OF INVENTION

In the piston rod manufacturing method disclosed in JP2011-56531A, because the respective end surfaces of the rod main body and the rod head are hollowed out before the friction welding, beads are formed on the inner circumferential side of the joining face by the friction welding. Because the beads formed on the inner circumferential side cannot be removed after the friction welding, stress is concentrated on root portions of the beads, and the joined body may be fractured from the joining face.

It is an object of the present invention to suppress deterioration of durability of the joined body.

According to one aspect of the present invention, a piston rod manufacturing method of manufacturing a piston rod by joining a solid rod main body and a solid rod head includes a first step of joining respective end surfaces of the rod main body and the rod head by friction welding; and a second step of performing boring process on an axial center portion from the rod head side so as to penetrate through a joining face between the rod main body and the rod head.

DESCRIPTION OF EMBODIMENTS

An embodiment of the present invention will be described below with reference to the drawings.

In a piston rod manufacturing method according to this embodiment, a piston rod 1 is manufactured by joining a rod main body 2 and a rod head 3 by friction welding. In this embodiment, the piston rod 1 is inserted into a cylinder main body of a fluid pressure cylinder used as an actuator (not shown) so as to be freely movable back and forth.

The rod main body 2 and the rod head 3 are manufactured by processing solid carbon steel manufactured by continuous casting. Steel having a carbon content of 0.45%, for example, is used as the carbon steel.

Figure 1:
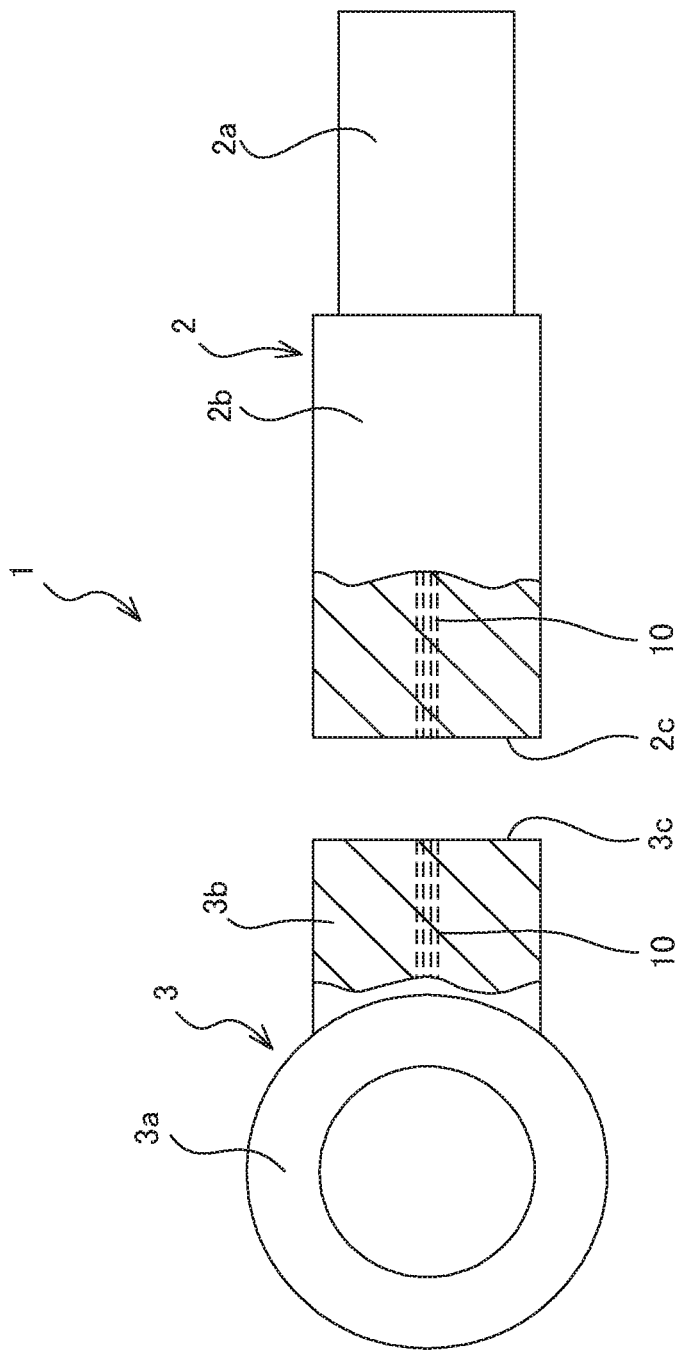
FIG. 1 is a plan view showing a rod main body and a rod head prior to a piston rod manufacturing process, in which a part thereof is shown in a sectional view.

The rod main body 2 and the rod head 3 will be described with reference to FIG. 1. FIG. 1 is a plan view showing the rod main body 2 and the rod head 3 prior to a manufacturing process of the piston rod 1 (prior to the friction welding).

The rod main body 2 has a small-diameter portion 2a linked to a piston (not shown) that slides in the cylinder main body and a solid large-diameter portion 2b having a larger diameter than the small-diameter portion 2a. A planar end surface 2c is formed on the large-diameter portion 2b of the rod main body 2.

The rod head 3 has an annular clevis 3a that is connected to a load and a solid body portion 3b having the same diameter as the large-diameter portion 2b of the rod main body 2. A planar end surface 3c is formed on the body portion 3b.

The piston rod 1 is manufactured by integrally joining the end surface 2c of the solid large-diameter portion 2b of the rod main body 2 and the end surface 3c of the solid body portion 3b of the rod head 3 by the friction welding.

Figure 2:
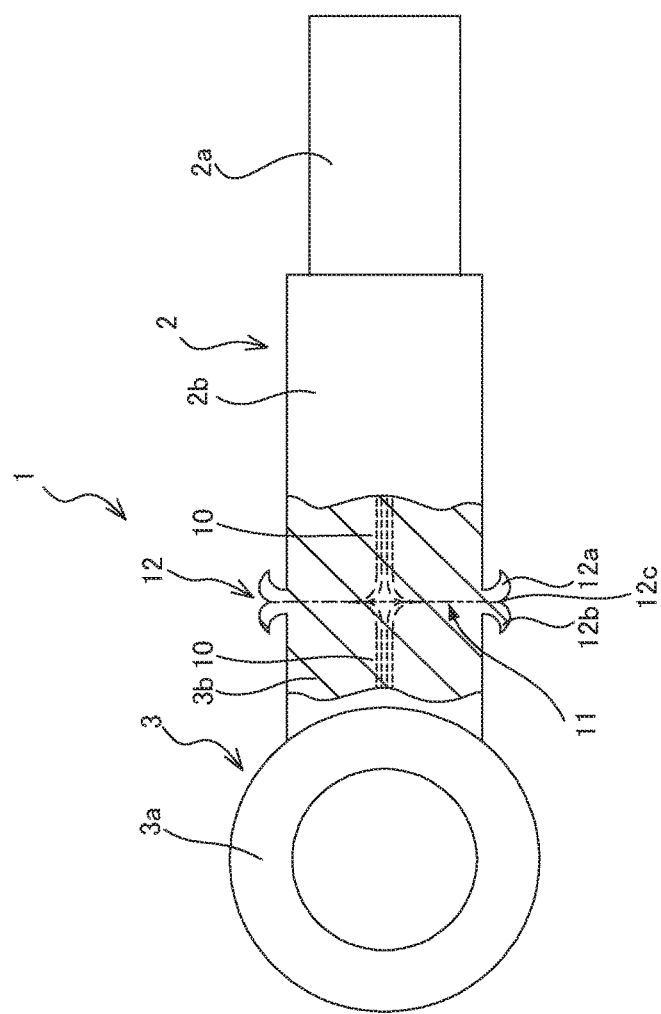
FIG. 2 is a diagram showing a first step in a piston rod manufacturing method according to the embodiment of the present invention, in which a part thereof is shown in a sectional view.
Figure 3:
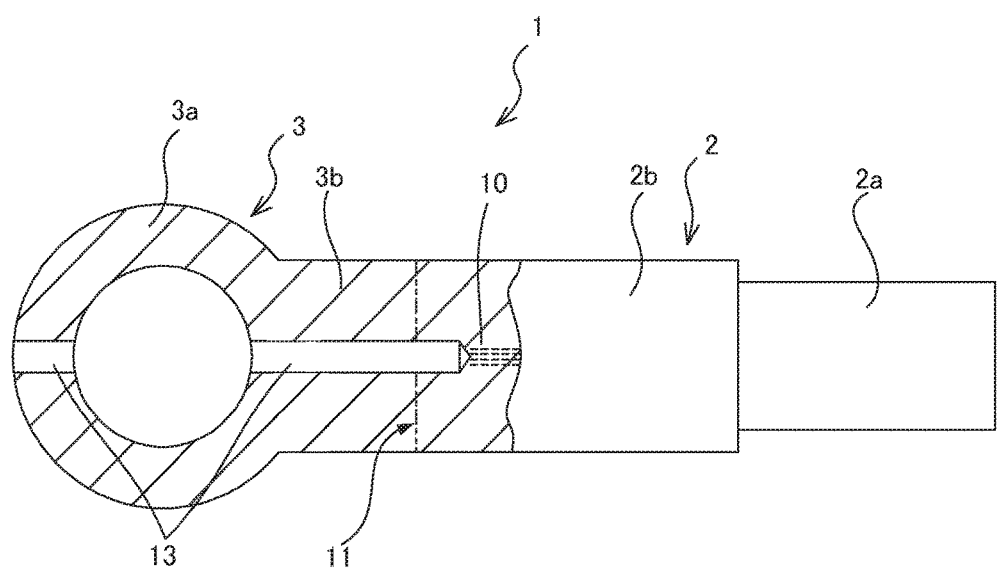
FIG. 3 is a diagram showing a second step in the piston rod manufacturing method according to the embodiment of the present invention, in which a part thereof is shown in a sectional view.

The rod main body 2 and the rod head 3 are manufactured by processing a solid steel material manufactured by continuous casting. Impurities contained in molten steel are more likely to remain in liquid than in solid, and therefore, during the continuous casting, impurities tend to accumulate in an axial center portion that solidifies last. Thus, impurities caused by center segregation exist in the axial center portion of the steel material manufactured by continuous casting. Therefore, impurities caused by center segregation exist in an axial center portion of the rod main body 2 and an axial center portion of the body portion 3b of the rod head 3. In FIGS. 1 to 3, impurities 10 are schematically illustrated by dotted lines.

Next, a manufacturing process of the piston rod 1 will be described with reference to FIGS. 2 and 3.

In a first step, the respective end surfaces 2c and 3c of the rod main body 2 and the rod head 3 are joined by the friction welding. Specific procedures of the friction welding that is the first step will be described below.

(1) As shown in FIG. 1, the rod main body 2 and the rod head 3 are disposed coaxially such that the respective end surfaces 2c and 3c face to each other.

(2) Next, as shown in FIG. 2, while rotating the rod head 3 about its central axis, the rod main body 2 is moved towards the rod head 3 such that the end surface 2c of the rod main body 2 is pressed against the end surface 3c of the rod head 3. As a result, friction heat is generated on a joining face 11, and the vicinity of the joining face 11 is softened by the friction heat.

(3) Rotation of the rod head 3 is stopped when the pressed rod main body 2 has moved by a predetermined amount of displacement.

(4) The rod main body 2 is pressed further against the rod head 3 side by a large load, and thereby, a high-temperature portion in the vicinity of the joining face 11 is caused to plastically flow to the outer circumferential side, as shown in FIG. 2, and is discharged in the form of burrs 12. As described above, because the high-temperature portion in the vicinity of the joining face 11 is discharged to the outer circumferential side in the form of the burrs 12, even when impurities exist at the joining face 11, the impurities are discharged effectively so that the joining face 11 is clean. Note that, as shown in FIG. 2, the burrs 12 are discharged until a boundary point 12c between a burr 12a of the rod main body 2 and a burr 12b of the rod head 3 appears on the outer side of respective outer circumferential surfaces of the rod main body 2 and the rod head 3.

(5) Finally, the pressed state achieved in the above-mentioned (4) is maintained for a predetermined amount of time in order to promote mutual diffusion between the rod main body 2 and the rod head 3 at the joining face 11, thereby joining of the rod main body 2 and the rod head 3 is completed. As described above, the rod main body 2 and the rod head 3 are joined by the friction welding.

Figure 4:
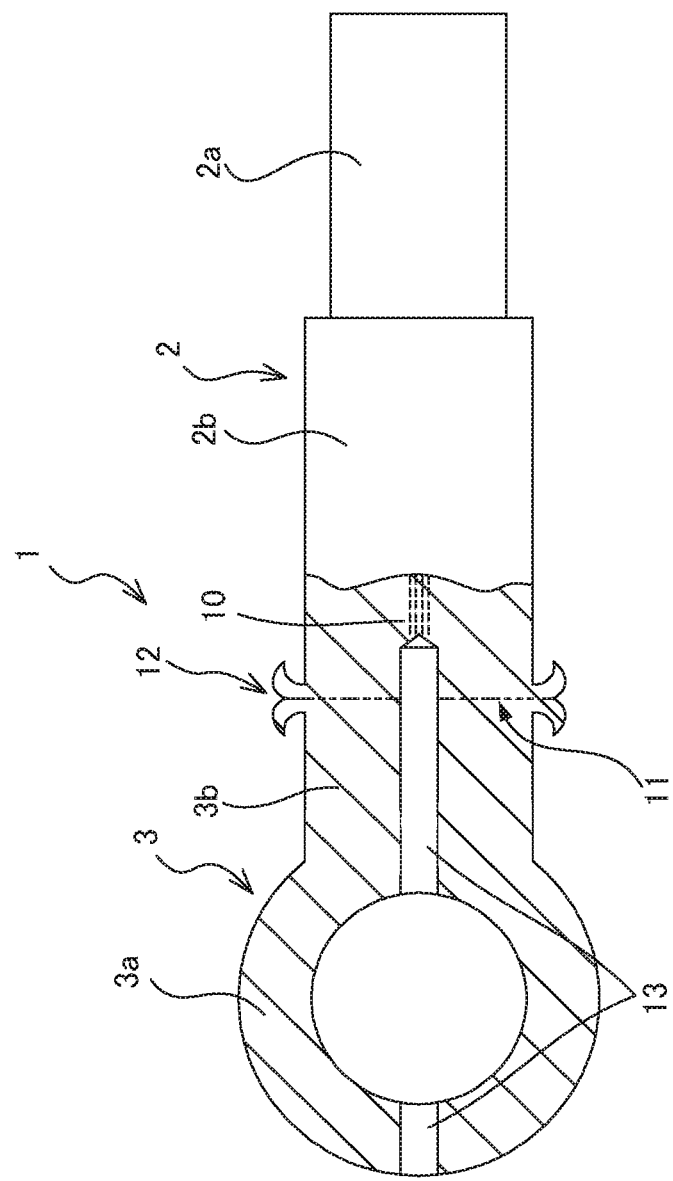
FIG. 4 is a diagram showing a piston rod that is manufactured by the piston rod manufacturing method according to an embodiment of the present invention, in a case in which burrs on an outer circumference of the piston rod are not removed.

As shown in FIG. 3, after completion of joining, the burrs 12 on the outer circumferential side of the piston rod 1 are removed, and the respective outer circumferences of the rod main body 2 and the rod head 3 are processed into a smooth continuous state. The burrs 12 on the outer circumferential side of the piston rod 1 may be removed after completion of the first step, or may be removed after completion of a second step, which will be described below. In addition, as shown in FIG. 4, the removal of the burrs 12 needs not be performed, and the burrs 12 may remain on the outer circumferential side of the piston rod 1.

After the completion of the first step, a quality inspection by means of a nondestructive test, such as an ultrasonic flaw inspection, is performed on a friction-welded portion between the rod main body 2 and the rod head 3. By performing such a quality inspection, it is possible to detect a defective joining or the like in the friction-welded portion.

Next, in the second step, as shown in FIG. 3, a boring process is performed, in which a hole 13 that penetrates from the rod head 3 side through the joining face 11 between the rod main body 2 and the rod head 3 is formed in the axial center portion.

The boring process as the second step is performed by inserting a cutting tool, such as a drill, from the rod head 3 side so as to pass through the respective axial center portions of the rod head 3 and the rod main body 2. The cutting tool is inserted from the left side in FIG. 3 so as to pass through the axial center portion of the rod head 3 from the clevis 3a to the body portion 3b of the rod head 3. After reaching the joining face 11 between the rod main body 2 and the rod head 3, the cutting tool continues to advance and penetrates through the joining face 11. The cutting tool is inserted until it passes through the axial center portion of the rod main body 2 and reaches a predetermined depth. As described above, in the second step, the boring process is performed by inserting the cutting tool so as to penetrate through the joining face 11 between the rod main body 2 and the rod head 3.

An insertion depth of the cutting tool after penetrating through the joining face 11 is determined by performing a test or an inspection on the joined body consisting of the rod main body 2 and the rod head 3 formed in the first step. Specifically, by performing the test or the inspection on some of the joined bodies formed in the first step as samples, a depth of a portion that needs to be removed of a center segregation portion in which the impurities 10 have accumulated is determined. In addition, as to a hole diameter of the hole 13 formed by the boring process, similarly to the depth, an optimal diameter is selected in accordance with a result of the test or the inspection on the joined body.

By performing the boring process as described above, it is possible to remove the center segregation portion of the axial center portion that causes delayed fracture. In addition, because the boring process is performed such that the hole penetrates through the joining face 11 between the rod main body 2 and the rod head 3, it is possible to prevent occurrence of separation fracture caused by delayed fracture at the joining face 11.

In addition, the second step including the boring process in which the center segregation is removed is performed after the first step in which the rod main body 2 and the rod head 3 are joined by the friction welding. Therefore, there is no bead on an inner circumference of the hole 13 of the piston rod 1. Thus, the stress does not concentrate on the inner circumferential side of the hole 13.

Furthermore, in this embodiment, the depth and the diameter of the hole 13 are determined in accordance with a result of the test or the inspection performed on the joined body formed in the first step with the rod main body 2 and the rod head 3. Therefore, even if the depth or the diameter of the center segregation portion that needs to be removed of the rod main body 2 and the rod head 3 is different due to variations in material lots, it is possible to reliably remove the center segregation portion of the axial center portion.

An opening of the hole 13 formed in the second step may be sealed by using a plug etc. With such a configuration, when the piston rod 1 is used in an environment in which rust is easily formed, it is possible to prevent formation of rust within the hole 13.

According to the embodiment mentioned above, the advantages described below are afforded.

With the manufacturing method of the piston rod 1 in this embodiment, after the respective end surfaces 2c and 3c of the rod main body 2 and the rod head 3 are joined by the friction welding, the boring process is performed on the axial center portion such that the hole penetrates through the joining face 11 from the rod head 3 side. Thus, it is possible to remove the impurities 10 caused by center segregation. In addition, because there is no bead inside the hole 13 of the piston rod 1, no stress is concentrated on the inner circumferential side of the hole 13. Therefore, it is possible to suppress deterioration of durability of the joined body.

In addition, by performing the boring process on the joined body consisting of the rod main body 2 and the rod head 3, it is possible to remove the impurities 10 caused by center segregation, and thereby, a material having a relatively low quality that contains the impurities 10 caused by center segregation in large quantity can be used to manufacture the piston rod 1. In other words, according to this embodiment, because the piston rod 1 can be manufactured using an inexpensive, relatively low-quality material, it is possible to reduce a manufacturing cost.

In addition, in a case of a piston rod manufacturing method in which the respective axial center portions of the rod main body 2 and the rod head 3 are hollowed out from the respective end surfaces in advance, and the friction welding is performed thereafter, a hollow space is already formed inside the resultant joined body. In such a case, when a quality inspection by means of a nondestructive test is performed on the friction-welded portion, the hollow space is detected as a defect. In contrast, in this embodiment, because the boring process is performed on the axial center portion after the joining by the friction welding, it is possible to perform a quality inspection by means of a nondestructive test on the friction-welded portion before the hole 13 is formed. Therefore, according to this embodiment, in the quality inspection by means of the nondestructive test on the friction-welded portion, a situation in which an internal hollow space is detected as a defect is avoided, and it is possible to reliably detect only defective items.

The embodiments of the present invention described above are merely illustration of some application examples of the present invention and not of the nature to limit the technical scope of the present invention to the specific constructions of the above embodiments.

The present application claims a priority based on Japanese Patent Application No. 2013-174759 filed with the Japan Patent Office on Aug. 26, 2013, all the contents of which are hereby incorporated by reference.

The invention claimed is:

1. A piston rod manufacturing method of manufacturing a piston rod by joining a solid rod main body and a rod head having an annular clevis connected to a load and a solid body portion, comprising:
    a first step of joining an end surface of the rod main body and an end surface of the body portion of the rod head at a joining face by friction welding; and
    a second step of performing a boring process on an axial center portion from the rod head side so as to form a hole that penetrates from the rod head side through the clevis and the joining face and into the rod main body;
    wherein the second step is performed after the first step.

2. The piston rod manufacturing method according to claim 1, further comprising
    a third step of sealing at least one of respective holes formed in the clevis and in the body portion in the second step with a sealing member.

3. The piston rod manufacturing method according to claim 1, further comprising
    a step of performing a quality inspection by means of a nondestructive test on a friction-welded portion between the rod main body and the rod head after the first step and before the second step.

* * * * *